United States Patent
Bejerano (10) Patent No.: US 9,031,571 B2
(45) Date of Patent: May 12, 2015

(54) METHODS AND APPARATUS FOR COVERAGE VERIFICATION IN A WIRELESS SENSOR NETWORK

(75) Inventor: Yigal Bejerano, Springfield, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 2062 days.

(21) Appl. No.: 12/101,333

(22) Filed: Apr. 11, 2008

(65) Prior Publication Data

US 2009/0257373 A1    Oct. 15, 2009

(51) Int. Cl.
*H04W 24/04*     (2009.01)
*H04W 84/18*     (2009.01)

(52) U.S. Cl.
CPC .............. *H04W 24/04* (2013.01); *H04W 84/18* (2013.01)

(58) Field of Classification Search
USPC ................................. 370/328; 455/456.1, 457
See application file for complete search history.

(56) References Cited

U.S. PATENT DOCUMENTS

| | | | |
|---|---|---|---|
| 6,744,740 B2 * | 6/2004 | Chen ............................. | 370/328 |
| 2005/0080924 A1 * | 4/2005 | Shang et al. ................... | 709/239 |
| 2005/0138200 A1 * | 6/2005 | Liu et al. ....................... | 709/238 |
| 2005/0228613 A1 * | 10/2005 | Fullerton et al. .............. | 702/150 |
| 2006/0031426 A1 * | 2/2006 | Mesarina et al. ............. | 709/220 |
| 2006/0259597 A1 * | 11/2006 | Jiang et al. .................... | 709/222 |
| 2007/0019594 A1 * | 1/2007 | Perumal et al. ............... | 370/338 |
| 2008/0125161 A1 * | 5/2008 | Ergen et al. ................... | 455/524 |
| 2009/0045939 A1 * | 2/2009 | Holland et al. ............... | 370/338 |

* cited by examiner

*Primary Examiner* — Rafael Pérez-Gutiérrez
(74) *Attorney, Agent, or Firm* — Ryan, Mason & Lewis, LLP (57) ABSTRACT

Methods and apparatus are provided for improved coverage verification schemes in a wireless sensor network that do not require information about the location of sensor nodes in the wireless sensor network. Coverage holes are detected by a first node in a wireless sensor network by obtaining an estimate of a distance to each of a plurality of additional nodes in a transmission radius of the first node; determining a relative location of each of the plurality of additional nodes in the coordinate system of the first node; identifying border segments of a sensing border of the first node, where each of the border segments comprises a section of a sensing border of the first node that is covered by a sensing radius of at least one of the additional nodes; and determining if a coverage hole exists for the first node by determining if a plurality of the border segments comprise a cyclic segment sequence. The coordinate system comprises r-map coordinates of the first node and the additional nodes, where r is based on a transmission radius of the first node.

20 Claims, 6 Drawing Sheets

| SYMBOL | SEMANTICS |
|---|---|
| $V$ | THE SET OF SENSORS IN THE GIVEN WSN. |
| $u$ | THE NODE THAT EXECUTES OUR SCHEME, ALSO DENOTES AS THE *ORIGIN* OF THE $r$-map COORDINATE SYSTEM. |
| $D_{u,v}$ | THE EUCLIDIAN DISTANCE BETWEEN NODES $u$ AND $v$. |
| $N_u$ | THE NEIGHBORS OF NODE $u$. |
| $N_u(r)$ | THE NEIGHBORS OF NODE $u$ LOCATED IN ITS $r$-vicinity. |
| $C_u$ | THE SENDING BORDER OF NODE $u$. |
| $D_v$ | THE *SENSING RANGE* OF NODE $v$. |
| $TR_u$ | THE *TRANSMISSION RADIUS* OF NODE $u$. |
| $SR_u$ | THE *SENSING RADIUS* OF NODE $u$. |
| $TR$ | A LOWER BOUND ON A NODE TRANSMISSION RADIUS, $(TR_u \geq TR)$. |
| $SR$ | AN UPPER BOUND ON A NODE SENSING RADIUS, $(SR_u \geq SR)$. |
| $r$ | $=2°/SR$ |
| $[u, v)$ | THE RAY ORIGINATED BY $u$ AND TRAVERSES THROUGH $v$. |
| $<v, u, w>$ | ANGLE BETWEEN THE RAYS $[u, v)$ AND $[u, w)$ AND ITS SIZE. |
| $S, \bar{\mu}$ | A SECTION OF $C_u$ AND ITS LENGTH MEASURED IN DEGREES. |

FIG. 2(b)

| SYMBOL | SEMANTICS |
|---|---|
| $(d_{u,v}, \theta_{u,v})$ | THE $r$-map COORDINATES OF NODE $v$ WHERE $u$ IS THE ORIGIN OF THE COORDINATE SYSTEM. |
| $\theta_{u,v}$ | – THE *AZIMUTH* (ANGLE) OF NODE $v$ RELATIVE TO AN *ARBITRARY POLAR-AXIS*. |
| $S_{u,v}$ | SEGMENT OF $C_u$ COVERED BY $D_v$, i.e., $S_{u,v} = C_u \cap D_v$. |
| $[\theta_{u,v}, \mu_{u,v}]$ | – THE SEGMENT $S_{u,v}$ IDENTIFIED BY THE DIRECTION (AZIMUTH) TO ITS CENTER POINT $\theta_{u,v}$ AND THE SEGMENT LENGTH $\mu_{u,v}$. |
| $[\delta^s_{u,v}, \delta^e_{u,v}]$ | – THE SEGMENT $S_{u,v}$ IDENTIFIED BY ITS START AND END AZIMUTHS, DENOTED BY $\delta^s_{u,v}$ AND $\delta^e_{u,v}$. |

METHODS AND APPARATUS FOR COVERAGE VERIFICATION IN A WIRELESS SENSOR NETWORK

FIELD OF THE INVENTION

The present invention relates to wireless sensor networks (WSNs) and, more particularly, to methods and apparatus for coverage verification techniques for such WSNs.

BACKGROUND

Recent advances in wireless communications and electronics have enabled the development of low-cost sensor nodes. Each sensor node can sense specific events in its vicinity, such as motion, noise, vibration or environmental conditions, and communicate with adjacent nodes. Thus, for event sensing applications, a large number of sensor nodes are deployed in a target field and they collaborate to form an ad-hoc network, referred to as a wireless sensor network. When a sensor detects an event, the sensor reports the event to a data collection center, referred to as a base station (BS), that may be several hops away.

WSNs provide significant improvements over traditional sensing means, since they collect monitoring information from numerous locations in the target field. Therefore, they have the potential to take on a major role in many civil and military applications, such as intrusion detection and environmental monitoring. Many of these applications are mission critical and require reliable detection of hazardous events. For such applications, a WSN typically must guarantee a reliable detection of the specified events. Therefore, the coverage of the target field is often considered as a measure of the Quality of Service (QoS) guaranteed by the WSN.

SUMMARY

Generally, methods and apparatus are provided for improved coverage verification schemes in a wireless sensor network. According to one aspect, a method is provided for detecting one or more coverage holes by a first node in a wireless sensor network. The method includes obtaining an estimate of a distance to each of a plurality of additional nodes in a transmission radius of the first node, determining a relative location of each of the plurality of additional nodes in a coordinate system of the first node, and identifying border segments of a sensing border of the first node. Each of the border segments comprises a section of a sensing border of the first node. The method includes determining if a coverage hole exists for the first node by determining if a plurality of the border segments comprise a cyclic segment sequence for the first node. The cyclic segment sequence comprises a sequence of the border segments, where each of the border segments overlaps with at least two other border segments.

In one exemplary implementation, the disclosed method can determine if a k-coverage hole exists. In addition, a transmission radius of the first node can optionally be at least twice a sensing radius of the first node. A more complete understanding of the present invention, as well as further features and advantages of the present invention, will be obtained by reference to the following detailed description and drawings.

DETAILED DESCRIPTION

Various embodiments provide improved coverage verification schemes useful in the absence of sensor location information. Some embodiments provide a k-coverage verification scheme that does not require sensor location information, where k is a minimum number (k≥1) of sensor nodes required to cover points in a target field. Herein, coverage-hole is an area that is not covered by at least one sensor node. Among other applications, some embodiments can be employed to selectively activate deployed nodes to ensure sufficient coverage.

Sensor nodes are prone to failures that may cause coverage holes in the target field. Coverage holes hamper the WSN ability to detect events and reduce the network reliability. Consequently, it is desirable for sensor nodes to have coverage hole detection mechanisms that ensure the network reliability and provide the required QoS.

A need therefore exists for improved coverage verification schemes. A further need exists for improved coverage verification schemes that do not require information regarding the location of sensors in the WSN.

As used herein, a wireless sensor network comprises any network that employs distributed sensor nodes to collect monitoring information from numerous locations in a target field. A wireless sensor network can optionally include wired portions. As used herein, a sensor node comprises a memory, a processor and a sensor for sensing one or more specific events, such as motion, noise, vibration or environmental conditions. In addition, a sensor node can communicate with adjacent sensor nodes or a centralized base station (or both). Exemplary sensor nodes from a wireless sensor network are discussed further below in conjunction with FIGS. 1(a) through 1(c).

As discussed further below in conjunction with FIG. 3, a sensor node, u, in a wireless sensor network may perform a coverage hole detection process to verify k-coverage of a sensing border of u. In one exemplary embodiment, the sensor node, u, initially obtains the distance to each additional node within the transmission radius of node u. Thereafter, the sensor node, u, establishes an individual coordinate system for the sensor node, u, and determines the relative location of each of the additional nodes in the individual coordinate system of the sensor node, u. The individual coordinate system allows a localized coordinate-free solution for coverage verification.

A segment sequence algorithm (discussed further below in conjunction with FIG. 6) is performed to identify border segments of the sensing border of node, u. Each of the border segments comprises a section of the sensing border of the sensor node, u, that is covered by a sensing range of at least one of the additional nodes. Finally, the disclosed method determines whether a coverage hole exists for the sensor node, u, by determining whether a plurality of the border segments comprises a cyclic segment sequence. Herein, a cyclic segment sequence is a sequence of border segments in which each of the border segments overlaps with at least two other border segments (and thereby fully covers the sensing border).

Coverage Verification Terminology

Coverage studies can be generally divided into two categories. The first category comprises probabilistic approaches for calculating the required node density for ensuring appropriate coverage. The second category includes approaches that utilize computational geometry for discovering coverage holes. Some studies also propose topology control solutions that maximize the network life time by scheduling the sensors' duty periods, while preserving coverage requirements. A number of studies have proposed various coverage hole detection schemes based on Voronoi Diagrams and Delaunay triangulation. A different approach has noticed that a sensor does not border a coverage hole if its sensing border is entirely covered by the sensing ranges of its neighbors. This local coverage verification approach is referred to as the sensing border concept.

Some studies seem to indicate a connectivity property for cases where the transmission radius of the nodes is at least twice the sensing radius. That is, in such cases, coverage implies connectivity of the sensor network. These methods, however, seem to typically require precise knowledge of the sensor locations (generally referred to herein as location information), which cannot be easily obtained. For sensor networks, simple positioning solutions, such as equipping each node with a GPS (Global Positioning System) receiver or a manual configuration of each node with its coordinates, are typically either expensive or impractical. Other position estimation techniques, such as beacon-based solutions usually provide only coarse location estimations in practical settings.

Coordinate-Free Solutions

The lack of accurate and cost-efficient positioning solutions motivates coverage verification schemes substantially oblivious to the node locations. Such schemes are referred to as coordinate-free solutions. Some such schemes have not, however, guaranteed finding small coverage holes. Thus, there is still a need for localized coordinate-free solutions for coverage verification.

k-Coverage Verification Without Location Information

Various embodiments address the challenge of k-coverage verification without using location information. A target field is termed k-covered, for a predefined k≥1, if points in the target field are included in the sensing range of at least k nodes.

Herein, a k-coverage hole is defined as a continuous area of the target field comprised of points that are covered by at most k−1 sensors. In particular, a 1-coverage hole (i.e., a coverage hole) is a continuous area that is not covered by any sensor.

In the exemplary embodiment, a large WSN is considered with numerous nodes. The sensing radius of each node is upper-bounded by SR and its transmission radius is lower-bounded by TR. The nodes do not need to be aware of their locations; however, a node can estimate its distance from its neighbors. For example, a node can estimate its distance from its neighbors by using the methods presented in B. Alavi and K Pahlavan, "Modeling of the TOA-Based Distance Measurement Error Using UWB Indoor Radio Measurements," IEEE Communications Letters, Vol. 10, No. 4, 275-277 (April 2006) or C. Y. Wen et al., "Distance Estimation Using Bidirectional Communications Without Synchronous Clocking," IEEE Trans. Signal Processing, Vol. 55, Issue 5, 1927-1939 (May 2007), each incorporated by reference herein. The distance estimates obtained by a given node are shared with its neighbors.

Thus, each node typically has only localized distance information of the distance between adjacent nodes in its vicinity and their sensing radiuses. A coordinate-free, distributed and accurate k-coverage verification solution typically exists if TR≥2·SR.

Figure 1A:
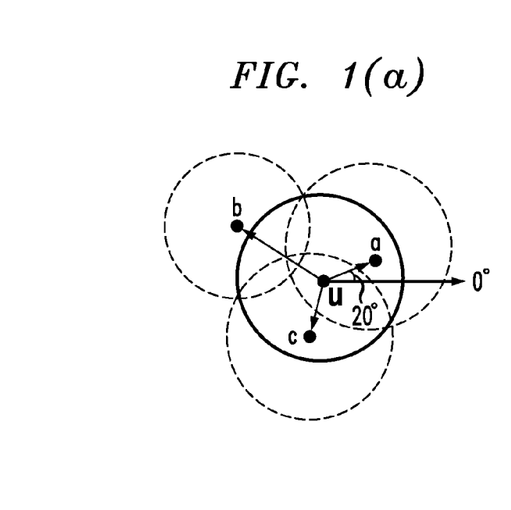
FIG. 1(a) illustrates a network with an original coordinate system.
Figure 1B:
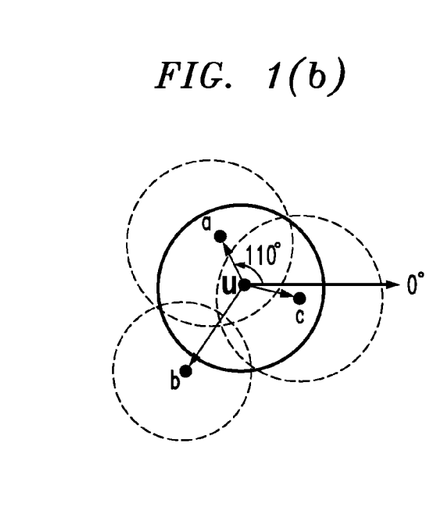
FIGS. 1(b) and 1(c) illustrate the network of FIG. 1(a) after various transformations of the coordinate system of FIG. 1(a)
Figure 1C:
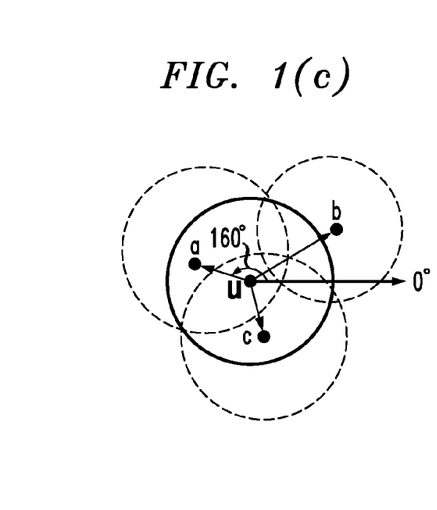

Various embodiments utilize the sensing border concept discussed above and each internal node verifies a local coverage of its vicinity by checking that its sensing border is k-covered by its neighbors. Unlike prior techniques, however; such verification can be achieved without using location information. An important observation is that the local coverage of a node is preserved in any coordinate system. For instance, consider a node u and three other nodes that completely covet its sensing border, as illustrated in FIG. 1(a). FIG. 1(a) illustrates a network with the original coordinate system. This local coverage is preserved also if the coordinate system is located or flipped over, as depicted in FIGS. 1(b) and 1(c). FIGS. 1(b) and 1(c) illustrate the network of FIG. 1(a) after a 90 degree rotation of the polar-axis and after reflection of the coordinate system, respectively.

Consequently, a node u can verify local coverage if it can determine the relative locations of its neighbors in any arbitrary coordinate system. A flexible variant of the polar coordinate system, termed an r-map coordinate system, is employed herein. Then, algorithms are presented for calculating the neighbors' locations of a given node at this coordinate system and verifying k-coverage.

According to an aspect, accurate coordinate-free detection solutions are shown to exist if TR≥2 SR. Then, the connectivity property, discussed above, is extended. It can be shown that coverage implies connectivity if TR≥2·SR.

According to another aspect, the concept of a cyclic segment sequence is used to construct a localized algorithm for detecting 1-cover age holes. According to yet another aspect, a distributed and localized k-coverage verification scheme is provided. The scheme extends the cyclic segment sequence concept and detects the presence of k-coverage holes. Initially, the scheme calculates the r-map coordinates of the neighbors of a reference node u. Then, the sensing border concept is used to detect k-coverage-holes. The scheme running time in an exemplary embodiment is $O(n^3)$, where n is the number of sensor s in the vicinity of u.

The Network Model

As previously indicated, an exemplary embodiment employs a wireless sensor network comprised of a large number of sensors, also called nodes, denoted by V. The sensors are generally distributed over a large target field, and they are designed to detect specified events. Each node u can sense specified events in its sensing range and communicate with adjacent nodes in its transmission range, referred to as the node cell. $D_u$ denotes the sensing range of a given node u∈V and $C_u$ denotes the sensing border of u around its sensing range. It is assumed that sensing and transmission ranges of a node u are disks with radiuses $SR_u$ and $TR_u$, respectively, where $TR_u > SR_u$. Moreover, an upper bound of SR on the sensing radius of each node and a lower bound of TR on its transmission radius are assumed, i.e., for every node u∈V, $SR_u \leq SR$ and $TR_u \geq TR$. The d-vicinity of node u∈V is defined as the disk of radius d≤TR, centered at the location of u and denote by $N_u(d)$ the set of neighbors of u that are located in its d-vicinity. For the sake of simplicity, it is assumed that there are no two sensors at the same location and each sensor has a unique identification number.

Consider, as the boundary band, the closed strip of width 2·SR that is adjacent to the edge of the target field. Periphery nodes that are located at the boundary band are distinguished from the other nodes, referred to as internal nodes. It is assumed that only internal nodes need to verify their coverage. The sensors are not aware of their locations. However, every sensor knows if it is a periphery or an internal node. This may be achieved in several ways. One option is configuring the nodes before placing them Another option is traversing the target field boundary with a hand-held device that updates all the periphery nodes. Finally, assuming that the target field does not contain coverage holes upon its activation time, the nodes may execute a boundary detection algorithm like the algorithm proposed herein or the one proposed in Y. Wang et al. The only requirement is that each node can estimate its distances from its neighbors, without the need to detect their orientation. As indicated above, B. Alavi and K. Pahlavan and C. Y. Wen et al. have introduced accurate distance estimation techniques that are applicable for wireless sensors.

Figure 2A:
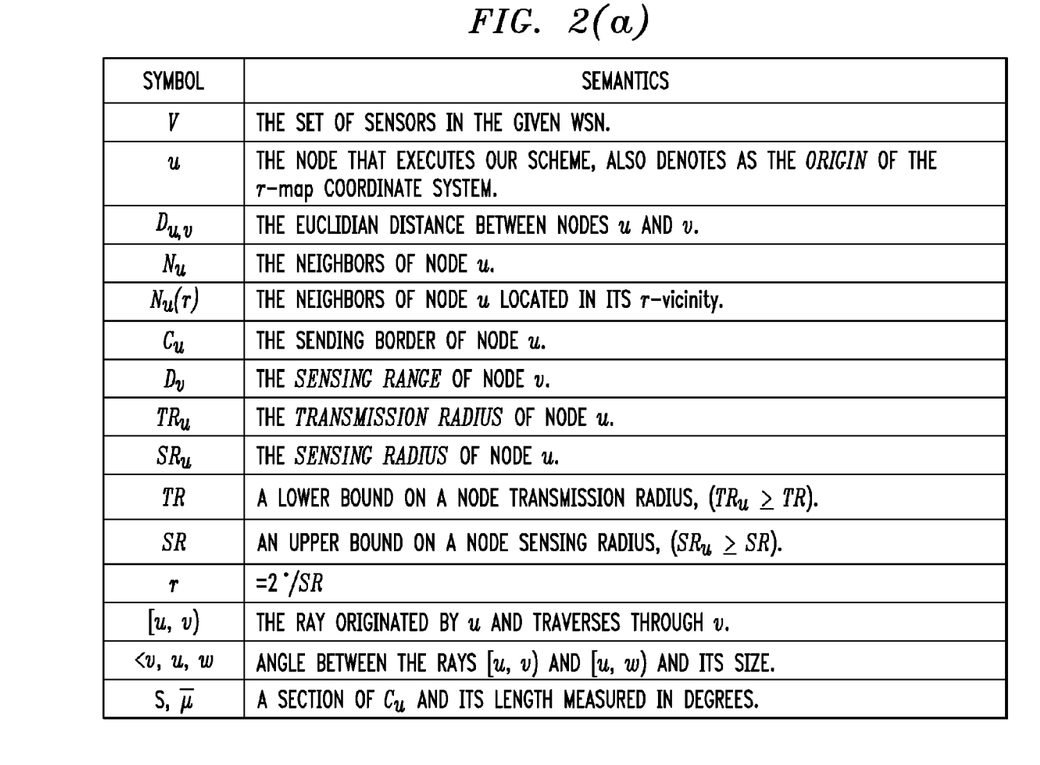
FIGS. 2(a) and 2(b) are tables summarizing notations employed herein.
Figure 2B:
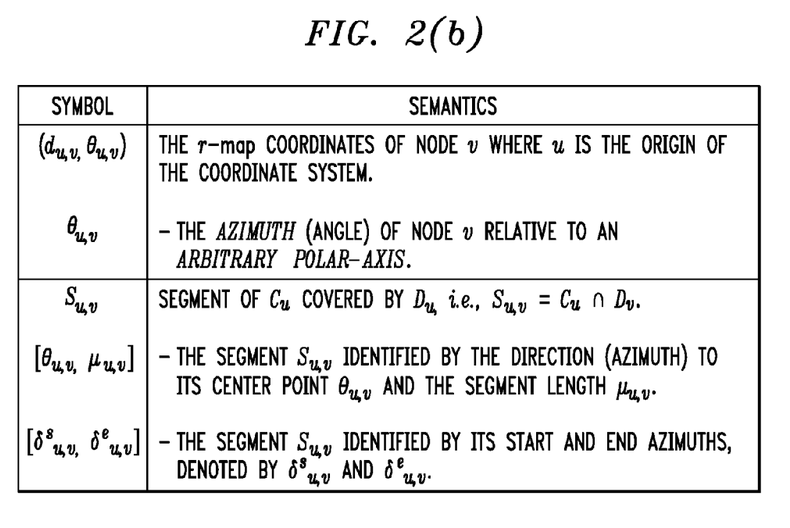

Consider a node u∈V. [u,v] denotes the ray originated at node u and traversing through the point v, where v may be a node location ∠v,u,w denotes the angle between the two rays [t, v] and [u, w). ∠v,u,w also denotes the angle size and it can be calculated by using the Cosine Rule, as follows:

$$\angle v, u, w = \cos^{-1} \frac{d_{v,u}^2 + d_{u,w}^2 - d_{v,w}^2}{2 \cdot d_{v,u} \cdot d_{u,w}}$$

where, $d_{v,u}$, $d_{u,w}$ and $d_{v,w}$ denote the distances between the points v, u and w, respectively FIGS. 2(a) and 2(b) are tables summarizing the notation employed herein FIG. 2(a) summarizes the general notation, while FIG. 2(b) summarizes the coordinates and segments.

Coverage Hole Detection Problem

Consider a WSN comprised of numerous sensors spread over a large target field, as described above. A point in the target field is k-covered if it is included in the sensing ranges of at least k nodes, otherwise it is termed k-uncovered. Similarly, the target field is considered k-covered if every point is k-covered (except for the boundary band) A k-coverage hole is defined as a continuous area of the target field comprised of k-uncovered points. For instance, if k=1, then every point of the coverage hole is not monitored by any sensor. It is desired to verify that the target field does not contain k-coverage holes of any size for a given k≥1. Distinguish between detecting the presence of coverage holes and finding their exact locations. Since the sensors do not need to know their locations, the sensors cannot report about the exact location of a coverage hole when they detect one. Thus, it is assumed that once a coverage hole has been detected, other means are applied for inferring the hole location, e.g., by backtracking the paths of the coverage-hole report messages or by using a coarse positioning system that provides a rough location estimations of the nodes.

Various embodiments address the challenge of detecting the presence of coverage holes without pointing to their exact locations. It is assumed that each internal node performs the proposed coverage verification scheme and informs a centralized base station when it detects a coverage hole. To this end, each node periodically estimates its distance from each one of its neighbors and shares this information with them. Consequently, each node has only localized distance information comprised of the distances between adjacent nodes in its cell and their sensing radiuses. Recall that localized distance information does not imply that the distance between every pair of sensors in a node's cell is known, since nodes in a given cell are not necessarily adjacent to each other. Thus, it is desired to design a coordinate-free scheme that enables each internal node to detect the presence of k-coverage holes in its vicinity by using only localized distance information.

Sensing Border Concept

Consider an internal node u that executes the disclosed scheme and let $C_u$ be its sensing border. $C_u$ is k-covered if every point of $C_u$ is k-covered by other nodes beside node u, otherwise $C_u$ is considered k-uncovered.

Principle 1: Assume that no two nodes are located in the same location. Then, the target field is k-coveted (except at the boundary band) if and only if the sensing border of every internal node is k-covered.

Recall that Principle 1 does not hold at the boundary band, where internal nodes may be adjacent to periphery nodes. To avoid edge problems, accurate k-coverage-verification can be guaranteed only for the internal area of the target field, excluding the boundary band.

The k-Coverage Verification Problem can be defined as a decision problem whose goal is to determine whether the sensing border of every internal node a is k-covered by using only localized distance information.

Conditions

Optional conditions for accurate detection of coverage holes are now presented.

Principle 2: Consider a WSN in which all the nodes have circular sensing and transmission ranges with radius SR and TR, respectively. Moreover, assume only localized distance information. Then, accurate coverage-hole detection is possible only if TR≥2 SR.

Coverage Hole Detection Scheme

A brief overview of the scheme is provided, starting with an observation for the disclosed solution.

Property 1: Consider two adjacent nodes u and v Node v covers a non-empty segment of u's sensing border, $C_u$, if and only if their distance $d_{u,v} \leq SR_u$, $+SR_v \leq 2 \cdot SR$.

To simplify the notation, r=2 SR. As used hereinafter, consider an internal node u that executes the disclosed scheme and its r-vicinity and the set $N_u(i)$ of sensors included in this area.

A. Hole Detection Scheme Overview

Figure 3:
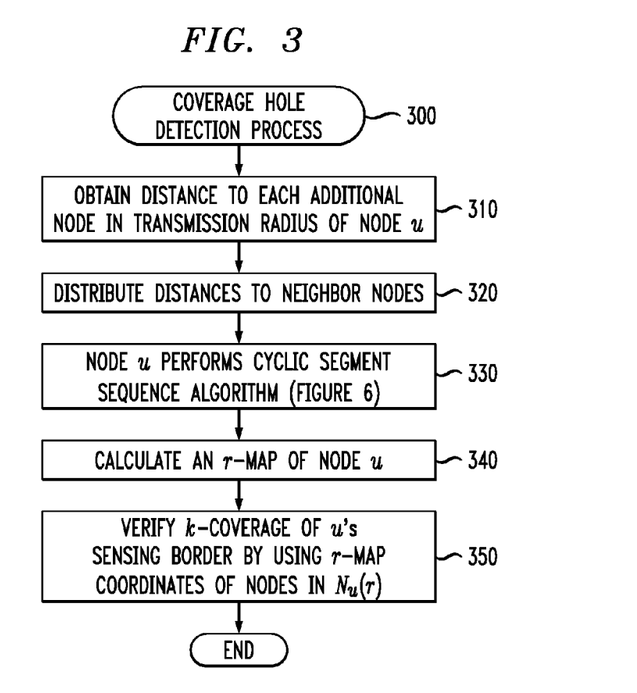
FIG. 3 is a flow chart describing an exemplary implementation of a coverage hole detection process.

FIG. 3 is a flow chart describing an exemplary implementation of a coverage hole detection process 300. As shown in FIG. 3, the disclosed scheme 300 initially obtains the distance to each additional node in the transmission radius of node u during step 310. Thereafter, the coverage hole detection process 300 distributes the distances obtained during step 310 to the neighbor nodes during step 320. During step 330, node u performs the cyclic segment sequence algorithm 600, described below in conjunction with FIG. 6. This is a 1-coverage-hole detection algorithm that does not require location information Generally, by using geometric properties, the algorithm finds a set $\tilde{V} \subseteq N_u(r)$ of nodes that indicates whether the sensing border of node u is 1 covered. The disclosed scheme 300 then calculates an r-map of node u during step 340, which is a variant of the polar coordinate system. As discussed hereinafter, the r-map allows node u to determine the relative location of its neighbor nodes in an individual coordinate system. In this manner, each node can have its own coordinate system. The latter represents the locations of the nodes in $N_u(r)$ relative to node u. To this end, the scheme first determines the relative coordinates on the nodes in $\tilde{V}$ and uses them as reference points to infer the coordinates of the other nodes. During step 350, the scheme 300 verifies k-coverage of u's sensing border by using the r-map coordinates of the nodes in $N_u(r)$, as described below in the section entitled "The k-Coverage Verification Algorithm."

B. The r-Map of Node u

The r-map of node u is a variant of the polar coordinate system that specifies the relative locations of the nodes in the r-vicinity of node u, denoted by $N_u(r)$. The location of every node $v \in N_u(r)$ is represented by a pair $<d_{u,v}, \theta_{u,v}>$, where $d_{u,v}$ is the radial coordinate that indicates the Euclidian distance between the nodes u and v. $\theta_{u,v}$ is the angular coordinate, also termed the azimuth, of node v that denotes the direction of v relative to an arbitrary polar-axis. Since the nodes do not need to know their locations and lack any direction information, a node u cannot determine the direction of the actual polar-axis or the counter-clock-wise direction of an angle. Thus, node u selects an arbitrary polar-axis and the angular coordinates, $\theta_{u,v}$, $v \in N_u(r)$, are measured in either counter-clock-wise or clock-wise direction, but not both. An example of various possible r-map coordinate systems of u are depicted in FIGS. 1(a) through 1(c). Principle 4 provides a linear translation from any r-map coordinate system to actual polar-coordinates of the nodes in $N_u(r)$, where node u is the origin of both coordinate systems.

Principle 4: Consider the r-map of node u denoted by a set of pair's $<d_{u,v}, \theta_{u,v}>$ fox every $v \in N_u(t)$. Let $\alpha$ be the angle between the actual polar-axis and the arbitrary polar axis selected by the r-map measured in counter-clock-wise direction. Moreover, let s=1 if the azimuths of the r-map axe measured in counter-clock-wise orientation, otherwise let s=−1. Then, the actual polar coordinates of node v are given by $<d_{u,v}, \alpha + s \cdot \theta_{u,v}>$.

Corollary 1: If the sensing border of node u is k-covered in one r-map coordinate system, then this property is satisfied by any r-map coordinate system. Hence, it is sufficient to identify the relative locations of the nodes $N_u(r)$ in any r-map coordinate system for verifying k-coverage.

C. Sensing Border Segments

Consider an origin node u and let $<d_{u,v}, \theta_{u,v}>$ be the r-map coordinates of node $v \in N_u(r)$.

The segment $S_{u,v}$ is the section of u's sensing border, $C_u$, that is covered by the sensing range, $D_v$, of node v, i.e., $S_{u,v} = C_u \cdot D_v$. From Property 1, it follows that $S_{u,v} \neq \emptyset$ if and only if $d_{u,v} \leq SR_u + SR_v$.

Two equivalent notations are used to define the segment $S_{u,v}$. The first notation is:

$$S_{u,v} = [\theta_{u,v}, \mu_{u,v}]$$

where $\theta_{u,v}$ is the azimuth of node v and also the direction of the segment center point. $\mu_{u,v}$ is the length of the segment measured in degrees. The second notation of $S_{u,v}$ is.

$$S_{u,v} = [\delta^s_{u,v}, \delta^e_{u,v}]$$

where, $\delta^s_{u,v}$ and $\delta^e_{u,v}$ the start and end azimuths (angles) of the segment start and end points, also referred to as edge points.

Property 2: Consider two nodes u and v with distance $d_{u,v} < SR_u + SR_v$ from each other. Then, by using the Cosine Rule, the length $\mu_{u,v}$ of the segment $S_{u,v}$ is:

$$\mu_{u,v} = 2 \cdot \cos^{-1} \frac{SR_u^2 + d_{u,v}^2 - SR_v^2}{2 \cdot SR_u \cdot d_{u,v}}$$

The start and end azimuths can be calculated as follows:

$$\delta^s_{u,v} = \theta_{u,v} - \Xi_{u,v}/2 \quad \delta^s_{u,v} = \theta_{u,v} + \mu_{u,v}/2$$

Cyclic Segment Sequence Algorithm

A 1-coverage-hole detection method is described, referred to as the segment sequence algorithm Assume that the algorithm is executed by a node u. It is further assumed that node u has already verified that its sensing range is not entirely subsumed in the sensing range of another node, by checking that $SR_v < SR_u + d_{u,v}$ for every node $v \in N_u(r)$. Moreover, consider the case where $TR \geq 2 \cdot SR$. Recall that in such settings, the nodes in $N_u(r)$ are not necessarily adjacent to each other.

A. The Cyclic Segment Sequence Concept

Consider a node u and the set of segments $\{S_{u,v}\}$ for every node $v \in N_u(r)$. Two segments, $S_{u,v}, S_{u,w}$, are called overlapping if they intersect, but one does not subsume the other.

A segment sequence of node u denoted by $Q_u$, is a set of segments such that, (a) a segment in $Q_u$ is not subsumed in any other segment in $Q_u$; and (b) every segment in $Q_u$ overlaps with exactly two other segments one from each side, except two segments (the first and the last segments) that each one of them overlap only with a single segment in $Q_u$.

A cyclic segment sequence of node u is a segment sequence $Q_u$ of u that its first and last segments overlap, i.e., every segment overlaps with exactly two other segments in $Q_u$.

The disclosed algorithms are based on the following Principle.

Principle 5: The sensing border of u is coveted if and only if node u has a cyclic segment sequence.

Figure 4A:
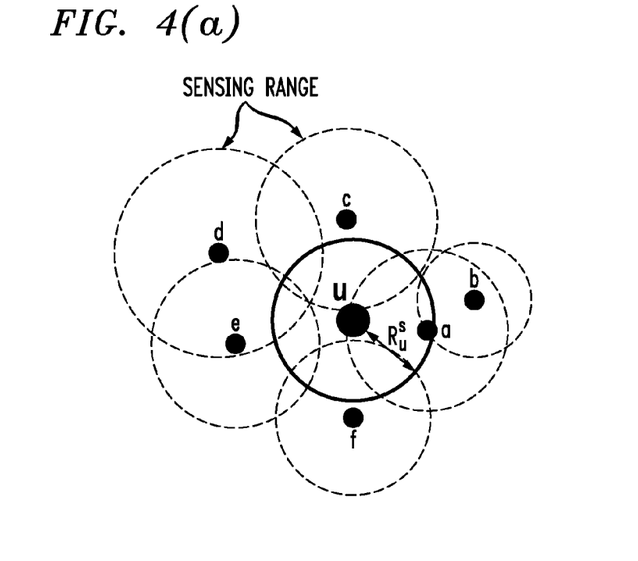
FIG. 4(a) illustrates a node u and its r-vicinity.
Figure 4B:
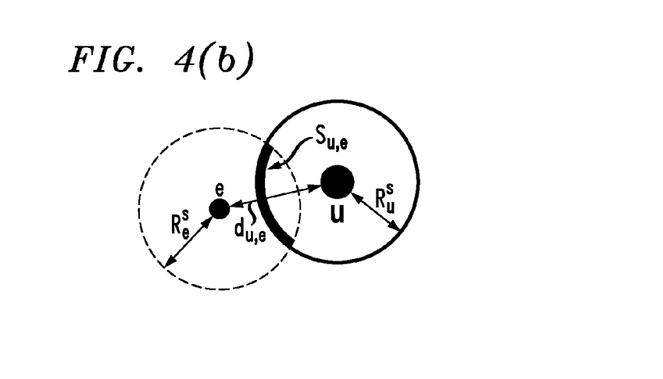
FIG. 4(b) illustrates an exemplary segment $S_{u,e}$ of node u
Figure 4C:
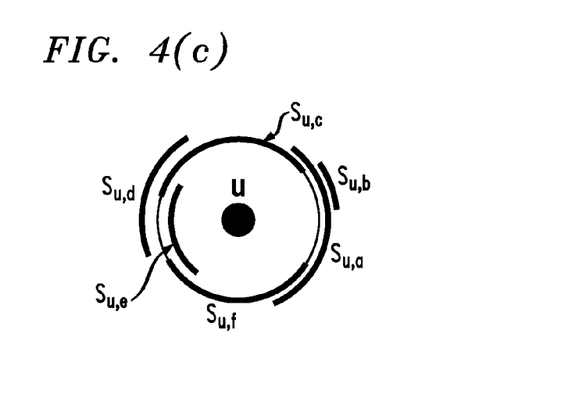
FIG. 4(c) illustrates six exemplary segments of node u.

As an example, consider the segments of u depicted in FIGS. 4(a) through 4(c) FIGS. 4(a) though 4(c) illustrate the sensing border concept FIG. 4(a) illustrates node u and its r-vicinity. FIG. 4(b) illustrates an exemplary segment $S_{u,e}$. FIG. 4(c) illustrates the six exemplary segments of node u. In this example, the cyclic segment sequence of u contains $Q_u = \{S_{u,a}, S_{u,c}, S_{u,e}, S_{u,f}\}$. Recall that $Q_u$ does not contain the segments $S_{u,b}$ and $S_{u,d}$, since $S_{u,b}$ is included in $S_{u,a}$ and $S_{u,d}$ is subsumed by the union $S_{u,c} \cup S_{u,e}$.

Property 3: If the segments $S_{u,v}$ and $S_{u,w}$ intersect, then the distance between the nodes, v and w, $d_{u,w} \leq r$. From this, it is implied that $v \in N_w(r)$, $w \in N_v(r)$ and $d_{u,v}$ as well as the size of the angle $\angle v, u, w$ are known.

Figure 5A:
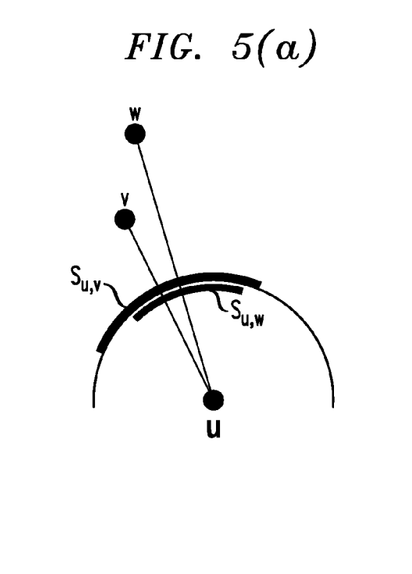
FIGS. 5(a) through 5(c) illustrate various intersection relationships for a number of exemplary segments.
Figure 5B:
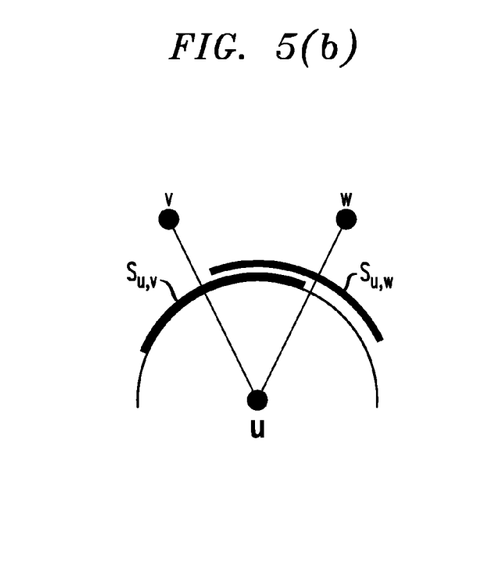
Figure 5C:
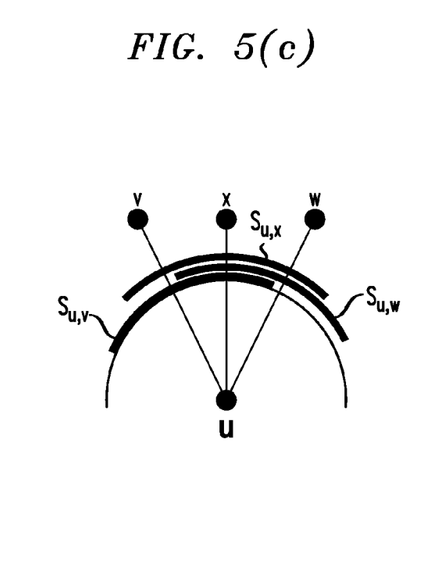

From Property 3, it results that the disclosed algorithm can detect whether any two segments are disjoint, overlap or one subsumes the other: as shown in the sub-section entitled "Useful Properties." Examples of these intersection relationships are given in FIGS. 5(a) through 5(c). FIG. 5(a) illustrates intersection relationships for $S_{u,w} \subset S_{u,v}$ (one subsumes the other). FIG. 5(b) illustrates intersection relationships for overlapping segments. FIG. 5(c) illustrates intersection relationships for $S_{u,x} \subset S_{u,v} \cap S_{u,w}$ (disjoint).

B. Description of Cyclic Segment Sequence Algorithm

Figure 6:
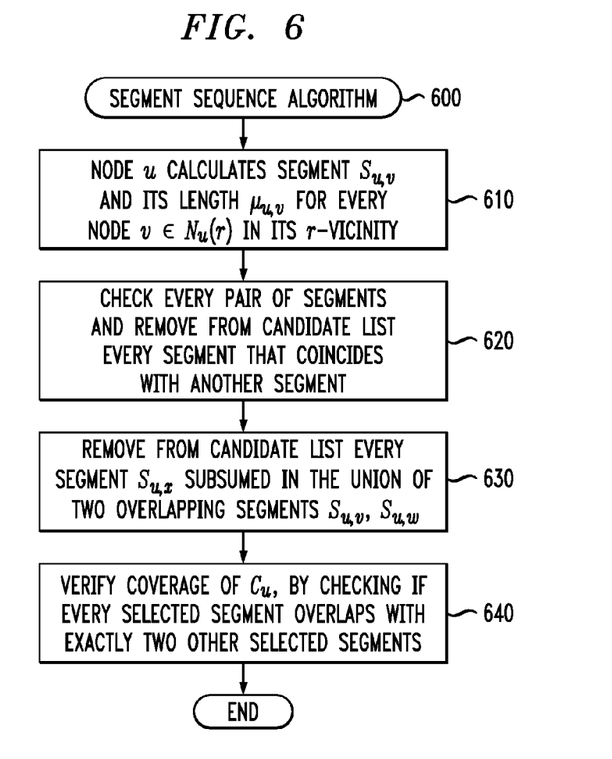
FIG. 6 is a flow chart describing an exemplary implementation of a cyclic segment sequence algorithm.

FIG. 6 is a flow chart describing an exemplary implementation of a cyclic segment sequence algorithm 600, based on Principle 5. The exemplary algorithm 600 comprises utilizes Properties 4-8 presented in the following sub-section.

Initially, during step 610, node a calculates the segment $S_{u,v}$ and its length $\mu_{u,v}$ for every node $v \in N_u(r)$ in its r-vicinity. All the segments are considered as candidates for the cyclic segment sequence of node u and they are inserted to a candidate list.

During step 620, the algorithm 600 checks every pair of segments and removes from the candidate list every segment that coincides with another segment, by applying Property 5.

During step 630, the algorithm 600 removes from the candidate list every segment $S_{u,x}$ subsumed in the union of two overlapping segments $S_{u,v}, S_{u,w}$, i.e., $S_{u,x} \subset S_{u,v} \cap S_{u,w}$. For this purpose, the algorithm detects every pair of overlapping candidate segments $S_{u,v}, S_{u,w}$, by using Property 6. Then, the algorithm 600 finds every candidate segment $S_{u,x}$ that is subsumed in $S_{u,v} \cap S_{u,w}$, by applying Property 7, and removes $S_{u,x}$ from the candidate list From Principle 5, it results that at the end of step 630, all the remaining candidate segments define one or more segment sequences and they are marked as selected.

Finally, during step 640, the algorithm 600 verifies coverage of $C_u$, by checking if every selected segment overlaps with exactly two other selected segments. This can be done, for instance, by using Property 6. Otherwise, the algorithm 600 estimates the hole-size, as described in the section entitled "Estimating the Hole Size," and reports to the base station about a coverage hole.

C. Useful Properties

A number of segment properties are discussed that are used by the disclosed algorithm. Consider two intersecting segments $S_{u,v}$ and $S_{u,w}$ with length $\mu_{u,v}$ and $\mu_{u,w}$, respectively. Notice that from Property 3, it results that $d_{u,w} \leq r$ and the angle $\angle v,u,w$ between the nodes v,u and w can be calculated. Otherwise, $S_{u,v}$ and $S_{u,w}$ are not intersecting.

Property 4: Segments $S_{u,v}$ and $S_{u,w}$ intersect if and only it $\mu_{u,w} + \mu_{u,v} > 2 \angle v,u,w$.

Property 5: Segment $S_{u,w}$ subsumes segment $S_{u,v}$ if and only if $\mu_{u,w} \geq \mu_{u,v} + 2 \cdot \angle v,u,w$.

Property 6: The segments $S_{u,v}$ and $S_{u,w}$ overlap if and only if;

$$\angle v, u, w > \left| \frac{\mu_{u,w} - \mu_{u,v}}{2} \right|; \text{ and} \quad (a)$$

$$\angle v, u, w \leq \frac{\mu_{u,w} - \mu_{u,v}}{2}. \quad (b)$$

Property 7: Consider three segments $S_{u,v}, S_{u,w}$ and $S_{u,x}$ that are pair-wise overlap (every pair of segments intersects, but one segment does not contain the other). Then, $S_{u,x} \subset S_{u,v} \cap S_{u,w}$ if and only if the following three conditions are satisfied $$\angle v,u,x + x,u,w = \angle v,u,w. \quad (a)$$

$$\mu_{u,x}/2 \mu_{u,v}/2 + \angle v,u,x. \quad (b)$$

$$\mu_{u,x}/2 < \mu_{u,w}/2 + \angle w,u,x. \quad (c)$$

Property 8. Consider two overlapping segments $S_{u,v}$ and $S_{u,w}$. Then, the length of the section of $C_u$ that is covered only by $S_{u,w}$ is $\Delta \mu = \phi v,u,w + \mu_{u,w}/2 - \mu_{u,v}/2$.

D. Correctness and Complexity Analysis

Principle 6: If the sensing border of u is coveted, then the algorithm finds a valid cyclic segment sequence of u.

Corollary 2: The segment sequence algorithm correctly verifies if a node borders a cover age hole.

Principle 7. The running time of the exemplary segment sequence algorithm is $O(n^3)$, where n is the number of nodes in $N_u(r)$.

E. Estimating the Hole Size

When a node u detects a coverage hole, it estimates a lower bound of the hole size and reports it to the base station. For the hole size estimation, node u calculates the length of the uncovered part of $C_u$, denoted by $\alpha$, and uses Property 9, below.

Property 9 Let $\alpha$ be the length of the uncovered section of $C_u$. Then, the diameter of the corresponding coverage hole is at least:

$$\text{Hole\_Diameter} \geq \begin{cases} 2 \cdot SR_u \cdot \sin\frac{\alpha}{2} & \text{if } \alpha < 180° \\ 2 \cdot SR_u \cdot \text{otherwise} \end{cases}$$

An iterative process is presented for calculating $\alpha$ assuming that $C_u$ is only partially covered by the segment sequence $Q_u$. Two cases are considered. If $Q_u$ contains a single segment $S_{u,v}$, then the length of the covered section is $\mu_{u,v}$. Otherwise, $Q_u$ contains a sequence with several segments such that every segment in $Q_u$ overlaps with exactly two other segments in $Q_u$, beside the first and last segments that have a single overlapping neighbors. For the second case, let $\bar{\mu}$ be the length of the section considered so far by the process and let $S_{u,v}$ be the last segment visited by the process. Initially, the process finds a segment $S_{u,v}$ with a single overlapping neighbor and its length $\mu_{u,v}$ is assigned to $\mu$. This is the first segment in the sequence. Then, iteratively, the process finds a segment $S_{u,w}$ that overlaps the last visited segment, $S_{u,v}$, and has not been visited yet. The length of the section covered solely by $S_{u,w}$ (and no other visited segment) is given by Property 8, and $\mu$ is updated accordingly Now, $S_{u,w}$ is considered as the last visited segment $(S_{u,v})$ for the next iteration. The process terminates when it finds the last segment of $Q_u$ that overlaps with a single segment.

Recall that when a coverage hole is detected, the set of selected segments may comprise several segment sequences. For evaluating the total length of the uncovered section, the total length of each one of the segment sequences is calculated and their length is removed from the total length of $C_u$, i.e., 360°. Then, by using Property 9, the hole size is estimated.

The k-Coverage Verification Algorithm

Figure 7:
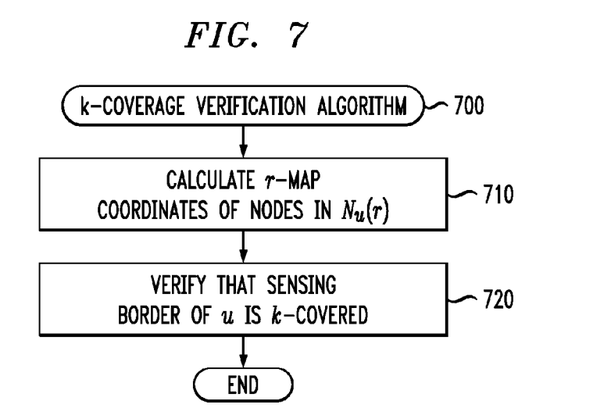
FIG. 7 is a flow chart describing an exemplary implementation of a k-coverage verification algorithm.

FIG. 7 is a flow chart describing an exemplary implementation of a k-coverage verification algorithm 700. In this section, the segment sequence algorithm, described above, is extended to verify k-coverage, for any k>1. After calculating a cyclic segment sequence, the disclosed scheme performs the following two steps. First, during step 710, the k-coverage verification algorithm 700 calculates the r-map coordinates of the nodes in $N_u(r)$, as discussed in the following sub-section. Then, during step 720, the k-coverage verification algorithm 700 uses an algorithm to verify that the sensing border of u is k-covered, as discussed in the second sub-section.

A. Calculating the r-Map of Node u

Calculate the r-map of u from a given cyclic segment sequence $Q_u$. Let $\tilde{V} = \{v_1, v_2, \ldots, v_j\}$ be the sequence of nodes $v_j \in N_u(r)$ that induce $Q_u$, i.e., each node $v_j \in \tilde{V}$ contributes the j-th segment of $Q_u$. Initially, the coordinates of the nodes in $\tilde{V}$ are calculated. The direction of node $v_1$ is selected to be the polar-axis of the r-map coordinate system (azimuth 0). Since the angle $\angle v_{j-1}, u, v_j$ induced by any two consecutive nodes $v_{j-1}, v_j \in \tilde{V}$ is known, the angular coordinates of the other nodes $v_j, j \geq 2$, is calculated iteratively by using the Equation 1, as follows:

$$\theta_{u\,v_j} = \theta_{u\,v_{j-1}} + \angle v_{j-1}, u, v_j = \sum_{i=2}^{J} \angle v_{i-1}, u, v_i \quad (1)$$

These calculations provide the r-map coordinates of every node $v_j \in \tilde{V}$. In the following, every node $v \in N_u(r)$ with known coordinates is referred to as an anchor node. To simplify the presentation, assume that $\tilde{V}$ contains at least three nodes and the angle $\angle v_{j-1}, u, v_j < 180°$, for any two consecutive nodes $v_{j-1}, v_j \in \tilde{V}$. The coordinates of the other nodes in $N_u(r) - \tilde{V}$ can be calculated by using Property 10.

Property 10: Consider a non-anchor node x that is adjacent to two anchor nodes $v, w \in N_u(r)$. Assume that $\theta_{u,v} - \theta_{u,w}$ and $0 < \angle v, u, w < 180°$. If $\angle v, u, w = \angle v, u, x + \angle x, u, w$ or $\angle v, u, x = \angle v, u, w + \angle w, u, x$, then the angular coordinate $\theta_{u,x}$ of x is $\theta_{u,x} = (\theta_{u,v} + \angle v, u, x)$ modulus 360° Otherwise, $\theta_{u,x} = (\theta_{u,v} - \angle v, u, x)$ modulus 360°.

The algorithm iteratively seeks a non-anchor node $x \in N_u(r)$ that is adjacent to two anchor nodes. Then, by using Property 10, it determines the azimuth of node x. The algorithm terminates when it does not find any more non-anchor nodes that their coordinates can be calculated. This occurs due to one of the following reasons; (a) All the nodes in $N_u(r)$ are anchor nodes, or (b) there are no more non-anchor nodes that satisfy the requirements of Property 10. In such case, it can be shown that the non-anchor nodes do not impact the k-coverage of u and can be safely ignored during the k-coverage verification process.

As an example, consider node u and its $N_u(t)$ neighbors depicted in FIGS. 4(a) through 4(c). As indicated above, the cyclic segment sequence of u is $Q_u = \{S_{u,a}, S_{u,c}, S_{u,e}, S_{u,f}\}$. Thus, $\tilde{V} = \{a, c, e, f\}$ and the direction of node a is selected as azimuth 0. The coordinates of the nodes c, e and f are calculated by using equation 1. Since node d is adjacent to nodes c and e, its coordinates can be calculated by using Property 10. In this case, the algorithm may not be able to calculate the coordinate of node b, since it is adjacent only to node a. Nevertheless, this does not impact the ability of the scheme to detect that node u is just 1-covered.

Principle 8: The r-map calculation routine computes a valid r-map of all the anchor nodes in $N_u(r)$.

Principle 9: The running time of the exemplary r-map calculation routine is $O(n^2)$, where n is the number of nodes in $N_u(r)$.

B. Verifying k-Cover Age

The sensing border of node u can be verified to be k-coveted, assuming that the r-map coordinates of u's neighbors are known. The algorithm contains the following steps Initially, it calculates the azimuths, $\delta^s_{u,v}$ and $\delta^e_{u,v}$, of the start and end points of every segment $S_{u,v} = [\delta^s_{u,v}, \delta^e_{u,v}]$ of node u, as defined above. Then, it computes a sequence L of the segments' edge-points, sorted in increasing order according to their azimuths. In the case of a tie, the start points are placed before the end points. It is assumed that all the angular coordinates of the segments' edge-points are in the range [0, 360°). Notice that if a segment $S_{u,v}$ contains azimuth 0, then $\delta^s_{u,v} > \delta^e_{u,v}$. Otherwise, $\delta^s_{u,v} < \delta^e_{u,v}$.

Next, the algorithm performs a "tour" around the sensing border, $C_u$, of node u and verifies that every point of $C_u$ is at least k-covered, Let the coverage-index of a point x be the number of nodes, excluding u, that their sensing ranges cover x. Recall that as the algorithm progresses along $C_u$ the coverage-index changes only when crossing a segment edge-point. For keeping track of the coverage-index during its tour along $C_u$, the algorithm maintains a variable, denoted by CI. The algorithm starts its tour at the point with azimuth 0, denoted by $<SR_u, 0>$, Thus, the initial value of CI is number of nodes (beside u) that their sensing ranges contain the point $<SR_u, 0>$. Now, the algorithm iteratively removes the first edge-point from L, until L is empty. If the selected edge-point is the start point of a segment, then CI is increased by one. Otherwise, it is reduced by one.

As an example, consider again node u and its neighbors depicted in FIGS. 4(a) through 4(c). The r-map coordinates of its neighbor's a, c, f, d, e, f are known, except the coordinates of node b. Thus, $L = \{\delta^s_c, \delta^e_a, \delta^s_d, \delta^s_e, \delta^e_c, \delta^e_d, \delta^s_f, \delta^e_e, \delta^s_a\}$ Recall that in this case $\delta^s_a > \delta^e_a$, since sensor a covers the point $<SR_u, 0>$. Initially, CI=1, because the point $<SR_u, 0>$ is covered only by sensor a (ignore sensor b). As the algorithm progresses along $C_u$, CI gets values in the range [1,3]. This confirms that $C_u$ is just 1-covered.

Principle 10: The sensing border of node u is k-covered if and only if CI is at least k at any given time.

Principle 11: The running time of the exemplary sensing border k-coverage routine is $O(n^2)$, where n is the number of nodes in $N_u(r)$.

C. Correctness and Complexity Analysis

Principle 12: The scheme correctly verifies the k-coverage of the target field if $TR \geq 2 \cdot SR$ (excluding an extended boundary band with width of 4 SR around the edge of the target field).

The overall running time of the exemplary k-coverage verification scheme is $O(n^3)$, where n is the number of nodes in $N_u(r)$.

CONCLUSION

While FIGS. 3, 6 and 7 show an exemplary sequence of steps, it is also an embodiment that the sequence may be varied. Various permutations of the algorithms are contemplated as alternate embodiments.

While exemplary embodiments have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computed. Such hardware and software may be embodied within circuits implemented within an integrated circuit.

Thus, the functions can be embodied in the form of methods and apparatuses for practicing those methods. One or more aspects can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network It is to be understood that the embodiments and variations shown and described herein are merely illustrative of the principles of this invention and that various modifications may be implemented by those skilled in the art without departing from the scope and spirit of the invention.

I claim:

1. A method, comprising:
   obtaining an estimate of a distance between a first node in a wireless sensor network and each of a plurality of additional nodes within a transmission radius of said first node;
   determining a relative location of each of said plurality of additional nodes with respect to a coordinate system of said first node;
   identifying border segments of a sensing border of said first node, wherein each of said border segments comprises a section of the sensing border of said first node that is covered by a sensing radius of at least one of said additional nodes; and
   determining whether a plurality of said border segments forms a cyclic segment sequence for said first node.

2. The method of claim 1, further comprising the step of determining whether a coverage hole exists based on the step of determining of whether said plurality of border segments forms said cyclic segment sequence for said first node.

3. The method of claim 2, wherein said step of determining whether said coverage hole exists further comprises the step of determining if a k-coverage hole exists, where k is greater than one.

4. The method of claim 1, further comprising providing said estimated distances to each of said plurality of additional nodes.

5. The method of claim 1, wherein said coordinate system comprises r-map coordinates of said first node and said additional nodes, where r is based on said transmission radius of said first node, and wherein said r-map coordinates specify said relative locations of each of said plurality of additional nodes in an r-vicinity of said first node.

6. The method of claim 5, wherein said relative location of each of said plurality of additional nodes in said r-vicinity of said first node is represented by a pair $<d_{u,v}, \theta_{u,v}>$, where $d_{u,v}$ is a radial coordinate indicating a distance between said first node and a corresponding one, v, of said additional nodes and $\theta_{u,v}$ is an angular coordinate of said corresponding one, v, of said additional nodes denoting a direction of said one, v, of said additional nodes relative to an arbitrary polar-axis.

7. The method of claim 1, wherein said coordinate system comprises an arbitrary polar axis and an angular coordinate for each of said plurality of additional nodes within said transmission radius.

8. The method of claim 1, wherein said cyclic segment sequence comprises a sequence of said border segments, wherein each of said border segments overlaps with at least two other border segments.

9. The method of claim 1, further comprising the step of estimating a size of a coverage hole.

10. The method of claim 1, wherein said first node is an internal node in said wireless sensor network.

11. The method of claim 1, wherein said transmission radius of said first node is at least twice a sensing radius of said first node.

12. An apparatus, comprising:
    a sensing node for a wireless sensor network, the node being configured to:
    obtain an estimate of a distance between a first node in a wireless sensor network and each of a plurality of additional nodes within a transmission radius of said first node;
    determine a relative location of each of said plurality of additional nodes with respect to a coordinate system of said first node;
    identify border segments of a sensing border of said first node, wherein each of said border segments comprises a section of the sensing border of said first node that is covered by a sensing radius of at least one of said additional nodes; and
    determine whether a plurality of said border segments forms a cyclic segment sequence for said first node.

13. The apparatus of claim 12, wherein the sensor node is further configured to determine whether a coverage hole exists based on the step of determining of whether said plurality of border segments forms said cyclic segment sequence for said first node.

14. The sensor node of claim 12, wherein said sensor node is further configured to determine if a k-coverage hole exists, where k is greater than one.

15. The sensor node of claim 12, wherein said sensor node is further configured to provide said estimated distances to each of said plurality of additional nodes.

16. The sensor node of claim 12, wherein said cyclic segment sequence comprises a sequence of said border segments, wherein each of said border segments overlaps with at least two other border segments.

17. The sensor node of claim 12, wherein a processor is further configured to estimate a size of a coverage hole.

18. The sensor node of claim 12, wherein said sensor node is an internal node in said wireless sensor network.

19. An article of manufacture, comprising a non-transitory computer readable storage medium encoding one or more machine-executable programs of instructions that perform the steps of:
    obtaining an estimate of a distance between a first node in a wireless sensor network and each of a plurality of additional nodes within a transmission radius of said first node;
    determining a relative location of each of said plurality of additional nodes with respect to a coordinate system of said first node;
    identifying border segments of a sensing border of said first node, wherein each of said border segments comprises a section of the sensing border of said first node that is covered by a sensing radius of at least one of said additional nodes; and
    determining whether a plurality of said border segments forms a cyclic segment sequence for said first node.

20. The article of claim 19, wherein the steps further comprise determining whether a coverage hole exists based on the step of determining of whether said plurality of border segments forms said cyclic segment sequence for said first node.

* * * * *